(12) United States Patent
Meakin et al.

(10) Patent No.: US 11,999,665 B2
(45) Date of Patent: * Jun. 4, 2024

(54) COMPOSITE FERTILISER SYSTEMS

(71) Applicant: YORK POTASH LTD, London (GB)

(72) Inventors: Robert John Meakin, Yorkshire (GB); Timothy David Lewis, Yorkshire (GB)

(73) Assignee: YORK POTASH LTD, London (GB)

( * ) Notice: Subject to any disclaimer, the term of this patent is extended or adjusted under 35 U.S.C. 154(b) by 356 days.

This patent is subject to a terminal disclaimer.

(21) Appl. No.: 17/144,026

(22) Filed: Jan. 7, 2021

(65) Prior Publication Data

US 2021/0130247 A1 May 6, 2021

Related U.S. Application Data

(63) Continuation of application No. 15/775,336, filed as application No. PCT/GB2016/053531 on Nov. 10, 2016, now Pat. No. 10,899,674.

(30) Foreign Application Priority Data

Nov. 13, 2015 (GB) ..................... 1520082

(51) Int. Cl.
  *C05D 1/00* (2006.01)
  *C05C 9/00* (2006.01)
  *C05G 5/12* (2020.01)
  *C05G 5/30* (2020.01)

(52) U.S. Cl.
  CPC ............... *C05C 9/005* (2013.01); *C05D 1/00* (2013.01); *C05G 5/12* (2020.02); *C05G 5/30* (2020.02)

(58) Field of Classification Search
  CPC .......... C05C 9/005; C05C 9/00; C05C 11/00; C05D 1/00; C05D 3/00; C05D 5/00; C05D 9/00; C05G 5/12; C05G 5/30; C05G 1/00
  See application file for complete search history.

(56) References Cited

U.S. PATENT DOCUMENTS 4,026,695 A ‡ 5/1977 Young ..................... C05C 1/00
                                                              71/28
10,899,674 B2 * 1/2021 Meakin .................... C05D 1/00

FOREIGN PATENT DOCUMENTS

| AU | 749213 B2 ‡ | 6/2002 |
| CN | 101575243 A ‡ | 11/2009 |
| CN | 101774866 A | 7/2010 |
| CN | 103842315 A | 6/2014 |
| CN | 108675856 A | 10/2018 |

(Continued)

OTHER PUBLICATIONS

Vitosh, M. L., J. W. Johnson, and D. B. Mengel. "TH-state fertilizer recommendations for corn, soybeans, wheat and alfalfa." Archive. lib. MSU. edu (1995). (Year: 1995).*

(Continued)

*Primary Examiner* — Jennifer A Smith
(74) *Attorney, Agent, or Firm* — Mintz, Levin, Cohn, Ferris, Glovsky and Popeo, P.C.

(57) ABSTRACT

A fertiliser pellet comprising: a first region of a nitrogen-providing fertiliser composition; and a second region adhered to the exterior of the first region, the second region comprising a fertiliser composition capable of providing (a) two or more alkali metal and/or alkaline earth metal nutrients and (b) sulphur.

24 Claims, 1 Drawing Sheet

(56) References Cited

FOREIGN PATENT DOCUMENTS

| GB | 2522492 A | * | 7/2015 | ............ B01J 2/006 |
|---|---|---|---|---|
| WO | WO-1999/015480 A1 | ‡ | 4/1999 | |
| WO | WO-2004/000759 A1 | ‡ | 12/2003 | |
| WO | WO-2015/017329 A2 | ‡ | 2/2015 | |
| WO | WO-2015/017329 A3 | | 3/2016 | |

OTHER PUBLICATIONS

Sirius Minerals PLC, "Executive Overview" (Year: 2016).*
International Search Report dated Jul. 2, 2017, for PCT Application No. PCT/GB2016/053531, filed Nov. 10, 2016, 4 pages.‡
Search Report dated May 17, 2016, for GB Application No. 1520082.7, filed Nov. 13, 2015, 5 pages.‡
Everris T&A brochure, ICL Specialty Fertilizers, 164 pages, Published: May 28, 2014.‡
Everris, "Poly-S Release Technology" https://everris.com/technologies/poly-s-release-technology/> Feb. 15, 2017.‡
Everiss, "ProTurf® ANZ ProTurf Spring 2014 Technology" http://web.everris.com/cn/ar4rp/anz-proturf-spring> 2014.‡
Vimeo, "ProTurf mini advert" https://vimeo.com/409874987> Apr. 20, 2020.‡
Twitter, "@Dave_Turfix" <https://twitter.com/Dave_Turfix/status/1182042439135223808> 2019.‡
Everiss, "ProTurf® ANZ ProTurf Spring 2014 Technology", 2 pages, <http://web.everris.com/cn/ar4rp/anz-proturf-spring> 2014.
Everris T&A brochure, ICL Specialty Fertilizers, 164 pages, Published: May 28, 2014.
Everris, "Poly-S Release Technology", 2 pages, <https://everris.com/technologies/poly-s-release-technology/> Feb. 15, 2017.
Examination Report dated Feb. 25, 2021 issued for GB Application No. 1520082.7, filed Nov. 13, 2015, 4 pages.
Search Report dated Nov. 16, 2020 (Nov. 16, 2020) for corresponding CN Application No. 2016800721587. 2 pages. [Chinese language only].
Twitter, "@Dave Turfix", 1 page, <https://twitter.com/Dave_Turfx/status/1182042439135223808> 2019.
Vimeo, "ProTurf mini advert", 1 page, <https://vimeo.com/409874987> Apr. 20, 2020.
Ren, J. Ed. (2013), "Handbook of Development and Utilization of Industrial Mineral Resources," p. 842. 3 pages. [Chinese language only].
Second Office Action issued in corresponding Chinese Application No. 201680072158.7, dated Aug. 10, 2021. 5 pages. [Chinese language].
Second Office Action issued in corresponding Chinese Application No. 201680072158.7, dated Aug. 10, 2021. 2 pages. [English language translation].
Second Search Report issued in corresponding Chinese Application No. 201680072158.7, dated Aug. 4, 2021 (dated Aug. 4, 2021). 2 pages. [Chinese language].
Second Search Report issued in corresponding Chinese Application No. 201680072158.7, dated Aug. 4, 2021 (dated Aug. 4, 2021). 2 pages. [English language translation].

* cited by examiner
‡ imported from a related application

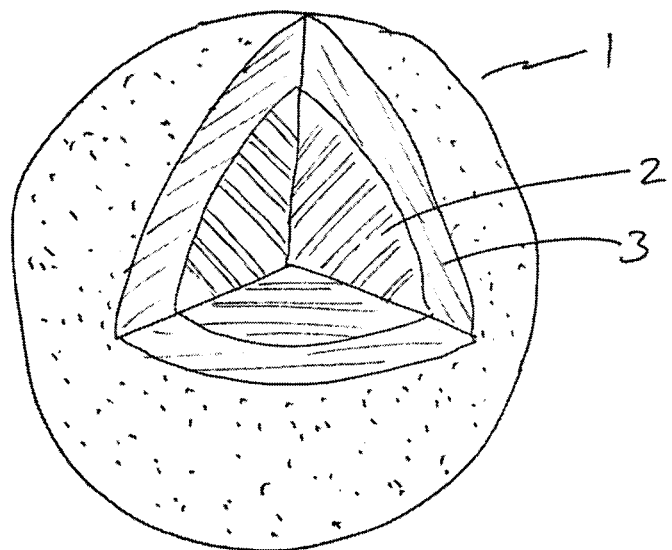

COMPOSITE FERTILISER SYSTEMS

This application is a continuation of U.S. application Ser. No. 15/775,336 filed May 10, 2018, issued as patent Ser. No. 10/899,674 on Jan. 26, 2021, which is a national stage filing under 35 USC Section 371 of International Application No. PCT/GB2016/053531 filed Nov. 10, 2016, which claims the benefit of priority to GB Application No. 1520082.7 filed Nov. 13, 2015.

This invention relates to the composition of fertiliser pellets.

A common way to supplement the nutrients that are available to plants is to treat a seedbed, field or other growing medium with fertiliser products in the form of agglomerated pellets. Pelletised products can have the advantages of being stable, easy to spread using conventional horticultural or agricultural machinery, and readily dispensed at a desired application rate.

A wide range of fertiliser compositions are available. The effectiveness of a particular fertiliser composition depends on factors including the type of plants for which it is used, the state of maturity of the plants, the pre-existing state of the growing medium, and the environmental conditions.

Key plant nutrients include nitrogen, phosphorus, potassium, magnesium, calcium and sulphur. In a fertiliser composition these individual nutrient elements may be incorporated through their inclusion in any of a number of chemical compounds. Although different compounds may include the same underlying nutrient element the bioavailability of those nutrient elements may differ depending on the mechanism by which the compound breaks down. The nutrients' bioavailability may also vary as a result of other aspects of the fertiliser's chemical or mechanical formulation. For example, some fertiliser pellets may incorporate coatings or binders that break down slowly in order to delay the release of nutrients, some compounds may rely on microbiota in the growing medium in order to release their nutrient elements and some compositions may make nutrients available in a chelated form so as to improve their uptake.

In order to provide multiple nutrients a grower may apply multiple distinct fertiliser compositions or alternatively a single multi-nutrient fertiliser composition. In order for a multi-nutrient composition to be effective its constituent compounds must be in suitably balanced proportions and must be capable of acting effectively even in the presence of the other constituents. This effectiveness may rely on factors other than the contents of the fertiliser: for example the presence of environmental water, heat or certain microbiota. The effectiveness on plants of multiple-nutrient fertilisers, particularly when dependent on environmental factors, is difficult to predict. However, if a multi-nutrient fertiliser composition is effective then it has the advantage that it requires only a single spreading operation to apply it to a crop.

Urea ($CO(NH_2)_2$) is commonly used as a nitrogen fertiliser. Urea can be made synthetically and then formed into pellets for spreading over a crop. U.S. Pat. No. 5,849,060 discloses using urea as the nucleus for a fertiliser pellet, with a coating of, for example, a phosphate or hydroxide.

It is known to form urea into fertiliser pellets and to form limestone into pellets for dressing to increase soil pH. This can be done by mixing powdered urea or limestone with a binder and then processing it in a pan pelletiser.

Certain minerals, particularly evaporite minerals, can be used as sources of nutrients such as potassium, calcium, magnesium and sulphur. For example, Gypsum can be pelletised and used as a source of calcium and sulphur.

Polyhalite is an evaporite mineral. It is a complex hydrated sulphate of potassium, calcium and magnesium of general formula $K_2Ca_2Mg(SO_4)_4.2H_2O$. Deposits of polyhalite occur in, amongst other countries, Austria, China, Germany, India, Iran, Turkey, Ukraine, the UK and the USA.

Polyhalite has the capacity to be valuable as a source of agricultural fertiliser. In some prior art processes it has been proposed to decompose natural polyhalite to extract specific nutrients. See, for example, WO 2013/074328, U.S. Pat. Nos. 1,946,068 and 4,246,019. However, intact polyhalite is also usable as a fertiliser, being able to supply sulphur, potassium, calcium and magnesium to the soil.

Mineral polyhalite can be spread in raw, crushed form. That minimises processing costs, but it has a number of disadvantages. Once applied to the soil the raw mineral takes some time to break down, delaying the bioavailability of its constituents. If applied in chipped form, the polyhalite tends to be of irregular shape and size, meaning that there can be difficulties in applying it uniformly, and meaning that it can be difficult to apply using some types of agricultural spreading machinery. Powdered polyhalite is difficult to spread evenly in an agricultural application, and since polyhalite powder can be hygroscopic its mechanical properties can vary quickly and radically over time once exposed to air.

It would be desirable to have a fertiliser product which is readily spread and provides a number of nutrients in a manner that is particularly beneficial to plants.

According to one aspect of the present invention there is provided a fertiliser pellet comprising: a first region of a nitrogen-providing fertiliser composition; and a second region adhered to the exterior of the first region, the second region comprising a fertiliser composition capable of providing (a) two or more alkali metals and/or alkaline earth metal nutrients and (b) sulphur.

Preferably the second region comprises (a) the two or more alkali metals and/or alkaline earth metals and (b) sulphur.

The first region may comprise more than 30% by weight of nitrogen.

The first region may comprise more than 80% by weight of urea. The first region may consist or substantially consist of urea.

The second region may comprise more than 30% by weight of alkali metals and/or alkaline earth metals, preferably in a form capable of acting as nutrients, most preferably plant nutrients The second region may comprise more than 10% by weight of each of two alkali metals and/or alkaline earth metals, preferably in a form capable of acting as nutrients, most preferably plant nutrients.

The second region may comprise more than 10% by weight of each of three alkali metals and/or alkaline earth metals, preferably in a form capable of acting as nutrients, most preferably plant nutrients.

The said alkali metals and/or alkaline earth metals may be or may be selected from the group comprising potassium, calcium and magnesium.

The second region may comprise more than 15% by weight of sulphur. The sulphur may be in the form of sulphate.

The second region may comprise a mineral powder. The second region may comprise more than 70% by weight of a mineral powder. The powder may be a powder of an evaporate mineral. The evaporate mineral may be polyhalite.

The second region may contact the first region over substantially the whole of its interface whereby it is adhered to the first region. The second region may be adhered directly to the first region. Alternatively an adhesive or other layer may be present between the first region and the second region. The second region may coat the first region.

The second region may surround/envelop or substantially surround/envelop the first region. The second region may constitute the outer surface of the pellet.

According to a second aspect there is provided a fertiliser product comprising a plurality of pellets as set out above.

The average diameter of the pellets may be less than 20 mm, less than 10 mm or less than 7 mm. The average diameter of the pellets may be greater than 2 mm, greater than 5 mm or greater than 7 mm.

In the pelletised fertiliser product at least 50% of the pellets, and preferably more than 80% of the pellets, may be pellets as set out above. Other pellets in the product may have a different composition.

The present invention will now be described by way of example with reference to the accompanying drawing.

FIG. 1 shows a cut-away view of a composite fertiliser pellet.

The fertiliser product to be described below is composed of solid pellets. In a preferred example each pellet comprises a urea core over which is a polyhalite layer. FIG. 1 shows an example of such a pellet. The pellet 1 comprises a core 2 of urea. Over the core is a layer 3 of polyhalite. The pellets can be spread on crops, on a seedbed or similar to act as a plant fertiliser. The fertiliser can supply potassium, calcium, magnesium and sulphur from the polyhalite layers of the pellets, and nitrogen from the urea cores of the pellets. In other examples the core could be of another fertilizer material than urea, as will be discussed in more detail below.

Urea is a source of nitrogen. Polyhalite is principally a source of potassium, magnesium, calcium and sulphur. Studies undertaken by the applicant indicate that providing fertiliser that has an outer layer of polyhalite and an inner region of urea can be particularly beneficial for plant growth and development with only a single spreading operation required. It is believed that this is due to one or more of the following factors. First, the outer polyhalite layer delivers a broad range of nutrients which support balanced growth in the initial phase of release from the pellets; and then as the outer layer degrades the urea region is exposed and releases nitrogen. This staggered release of nutrients is believed to promote accelerated plant growth and development without the need for separate spreading of distinct fertilisers. Second, whilst sulphur-coated urea fertilisers are already known, elemental sulphur requires microbial oxidative chemistry to make it available to plants, whereas polyhalite supplies sulphur already in an immediately available form for plant uptake and metabolism. Third, naturally occurring polyhalite can often contain additional micronutrients which are helpful in the early stages of plant growth.

In general a composite pellet 1 of the type shown in FIG. 1 may comprise the following.

a. A first region 2 acting as a nitrogen fertiliser. The first region may, for example, comprise more than 30% nitrogen by weight. The pellet may be arranged so that the first region is fully or partially coated on its exterior, and therefore not wholly exposed at the outer surface of the pellet. Conveniently, less than 50% and preferably less than 20%, less than 10%, less than 5% and most preferably none of the exterior surface of the first region is exposed at the exterior of the pellet.

b. A second region 3 acting as a fertiliser that provides (i) two or more alkali metals and/or alkaline earth metals and (ii) sulphur. The second region may, for example, comprise more than 30% alkali metals and alkaline earth metals by weight, and more than 15% or more than 20% sulphur by weight.

Preferably the first region is substantially soluble in or degradable by water. Preferably the second region is substantially soluble in or degradable by water. Where the second region comprises powder bound together with a binder, the binder may be water-soluble.

In the case where the pellet comprises a core of urea, the urea core may contain from 50 to 100% of urea by weight, more preferably 75 to 100%, more preferably 85 to 100%. The urea core may additionally contain a binder and/or other constituents. Those constituents may be homogeneously dispersed through the core. Alternatively, the core may encapsulate a region of a substantially different composition, for example a non-urea fertiliser.

The core may be of any desired shape, but conveniently it is substantially spherical. For example, it may have a Wadell sphericity of 0.9 or above.

The size of the core may be such that it has a largest dimension less than 5 mm, less than 4 mm, less than 3 mm, less than 2 mm or less than 1 mm. The size of the urea core may be such that it has a smallest dimension greater than 4 mm, greater than 3 mm, greater than 2 mm, greater than 1 mm or greater than 0.5 mm. The volume of the core may be less than 20 $mm^3$, less than 15 $mm^3$, less than 10 $mm^3$, less than 8 $mm^3$ or less than 5 $mm^3$. The volume of the core may be greater than 15 $mm^3$, greater than 10 $mm^3$, greater than 8 $mm^3$, greater than 5 $mm^3$ or greater than 1 $mm^3$. Other dimensions could be adopted.

The core may be formed by any suitable mechanism, for example, in the case of a urea core it may be formed by prilling or granulation. Methods of producing urea pellets are well known.

The urea core may be formed by any suitable mechanism, for example prilling or granulation.

In the case where the layer 3 comprises polyhalite, the layer 3 may contain from 50 to 100% of polyhalite by weight, more preferably 75 to 100%, more preferably 85 to 100%. In addition to polyhalite the polyhalite layer may contain a binder and/or other constituents. Those constituents may be homogeneously dispersed through the layer.

Preferably the coating layer 3 entirely covers the inner region or core 2. In a bulk product the core may be entirely covered by the outer layer in, for example, more than 90%, more than 95% or more than 99% of the pellets of the bulk product.

Preferably the outer layer 3 is in contact with the majority of the outer surface of the inner region 2. Alternatively there may be an intermediate layer between the inner region and the outer layer. Such an intermediate layer may be a layer of a binder and/or adhesive such as PVA or starch.

Preferably the outer layer 3 is of a substantially uniform thickness. The maximum thickness of the outer layer may be less than 5 mm, less than 4 mm, less than 3 mm, less than 2 mm, less than 1 mm or less than 0.5 mm. The minimum thickness of the outer layer may be greater than 4 mm, greater than 3 mm, greater than 2 mm, greater than 1 mm, greater than 0.5 mm or greater than 0.1 mm. The volume of the outer layer may be less than 20 $mm^3$, less than 15 $mm^3$, less than 10 $mm^3$, less than 8 $mm^3$ or less than 5 $mm^3$. The volume of the outer layer may be greater than 15 $mm^3$, greater than 10 $mm^3$, greater than 8 $mm^3$, greater than 5 $mm^3$ or greater than 1 $mm^3$. Other dimensions could be adopted.

The volume of the outer layer may be between 50% and 100% or alternatively between 75% and 150% or alternatively between 100% and 200% of the volume of the inner region. Other proportions could be adopted.

The pellet comprising the inner region and the outer layer may be of any desired shape, but conveniently it is substantially spherical. For example, it may have a Wadell sphericity of 0.9 or above. The size of the pellet may be such that it has a largest dimension less than 10 mm, less than 7 mm, less than 6 mm, less than 5 mm or less than 4 mm. The size of the pellet may be such that it has a smallest dimension greater than 6 mm, greater than 5 mm, greater than 4 mm, greater than 3 mm or greater than 1 mm. The volume of the pellet may be less than 70 mm$^3$, less than 60 mm$^3$, less than 50 mm$^3$, less than 40 mm$^3$ or less than 30 mm$^3$. The volume of the pellet may be greater than 20 mm$^3$, greater than 30 mm$^3$, greater than 40 mm$^3$, greater than 50 mm$^3$ or greater than 60 mm$^3$. Other dimensions could be adopted.

The size of the pellet and the relative sizes of the core 2 and the outer layer 3 can be selected for best performance in the environmental conditions and on the crop for which the fertiliser is intended.

In the case of a fertiliser in bulk, the values given above for the sizes, shapes and relationship between the core 2 and the outer layer 3, and for the size and shape of the pellet itself may be mean or median values over the bulk. Alternatively, greater than 50%, greater than 80% or greater than 90% of the particles of the bulk fertiliser may be taken to have the requisite value(s).

There could be a coating over the exterior of the polyhalite layer 3. That could, for example, be a sealant (e.g. to resist breakdown of the pellet in transit) or a lubricant (e.g. to assist in spreading of the pellet). The coating could be water-soluble so that it degrades readily when the pellet is spread on a crop or growing medium.

As indicated above, polyhalite is a complex hydrated sulphate of potassium, calcium and magnesium of general formula $K_2Ca_2Mg(SO_4)_4.2H_2O$. Polyhalite has a Moh's hardness of around 2.5 to 3.5. Polyhalite can be extracted from natural reserves by mining. Once mined, the polyhalite may be broken into blocks or chips of suitable size for transport and processing. For example, the as-mined rock may be fed to crushers such as jaw crushers and/or cone crushers in order to yield a chipped material of generally uniform size. It has been found that chips of largest dimension no greater than around 20 mm and/or of average dimension between 5 and 10 mm are convenient for transportation from a mine. The chips can be transported by conveyor, trucks or any other convenient mechanism.

In one example of a method for forming the pellet of FIG. 1, raw or chipped polyhalite is processed to form a polyhalite powder. This may suitably be done by milling, for example in a ball mill (e.g. a continuous "Hardinge" ball mill) or more preferably an attritor mill. In an attritor mill the feedstock is agitated together with freely moving grinding elements such as steel balls. Air-swept suction may be applied in order to draw the milled material out of the mill. This allows the milling to be performed as a continuous process if desired, with chipped feedstock being added to the mill and powder being swept out of the mill by gas flow whilst the grinding elements continue to be agitated. The average grain size of the powder resulting from the mill is dependent on various process parameters of the milling operation, including the dwell time of the feedstock in the mill. Conveniently, the mill may be arranged to produce polyhalite powder of a grain size generally around 200 µm: for example in the range from 50 to 500 µm or more preferably from 100 to 300 µm. Conveniently at least 50% or more preferably at least 70% of the mass of the polyhalite powder is composed of grains having a grain size, or a largest or average diameter, in one of the above ranges. The number average grain size of the polyhalite powder may be in one of those ranges. The grain size may be as measured by means of a Malvern Mastersizer 2000 or as measured by means of a sieve shaker.

In the next processing stage the polyhalite powder is combined with starch particles to form a dry homogeneous blend of polyhalite and starch. This mixing phase is preferably performed so that the polyhalite and starch are mixed in the absence of free water, since that allows the components to be blended together more easily and effectively. The polyhalite and starch may be combined in any suitable mixing device or series of mixing devices. In one example, the polyhalite and starch are fed separately into a single mixer, which is operated so as to output a homogeneous blend of polyhalite and starch. That mixer may be a relatively high shear mixer. It may for example be a pin mixer or a twin-shaft mixer. In a second example, the polyhalite and starch may be fed separately to a first mixer which performs initial mixing of the components, and the output of that first mixer may then be fed to a second mixer which mixes them further. In this two-stage process the first mixing stage may be performed at relatively low shear and the second mixing stage at relatively high shear, or vice versa. The first stage mixer may for example be a ribbon mixer, a pin mixer or a twin-shaft mixer. The second stage mixer may for example be a pin mixer or a twin-shaft mixer. It is advantageous for the or each mixer to be operated in a continuous process. To achieve that the feedstock: polyhalite and starch as separate feeds or as a partially blended single feed, can be fed to one end of the mixer and the agitation process can be arranged to feed material progressively towards a discharge opening at the opposite end of the mixer. The length of the mixer, the mixing speed and the agitator (e.g. pin or paddle) design can be selected so as to achieve sufficient dwell time in the mixer that the output from the mixture is of the desired homogeneity and/or plasticity: for example until it is substantially homogeneous. The operating power of the mixer can be controlled to apply the desired level of shear.

The starch may be derived from any convenient source, for example corn, potato, rice, tapioca or wheat. The starch could be a synthetic starch. The starch may consist essentially of chains of amylose and amylopectin. For example the content of the starch feed may comprise at least 50% and more preferably at least 75% amylose and amylopectin (in total) by weight. The starch may be in powdered form or in granules. Preferably the starch is of a powder having a grain size generally around 500 µm: for example in the range from 200 to 800 µm or more preferably from 350 to 650 µm. Conveniently at least 50% or more preferably at least 70% of the mass of the starch powder is composed of grains having a grain size, or a largest or average diameter, in one of the above ranges. The number average grain size of the starch powder may be in one of those ranges. The grain size may be as measured by means of a Malvern Mastersizer 2000 or as measured by means of a sieve shaker. The starch acts as a binder to help the polyhalite powder to adhere to itself, thereby increasing the strength of the polyhalite layer of the eventual pellets. This is significant because the pellets should preferably be capable of resisting mechanical breakdown when spread through conventional agricultural spreaders. The binder also renders the polyhalite powder more plastic, which aids in the subsequent processing steps.

Thus, in one example of the first mixing stage the polyhalite powder is mixed with particulate starch, under dry conditions and in more or more mixing steps, to form a homogeneous dry blend. Water could alternatively be added during the first stage, but it is preferred that there is at least an initial dry mixing stage, performed substantially in the absence of free water. During the first mixing phase the mixture is preferable held under conditions under which gelling of the starch is inhibited, for example by keeping the mixture below the gelatinization temperature of the starch.

The proportion of starch to be added to the mixture will depend on the nature of the starch being used. The proportion should be selected so as to achieve satisfactory strength in the resulting polyhalite pellets.

In a second mixing stage the pre-blended polyhalite and starch mixture is mixed with water under conditions that are such as to cause the starch to gelatinise. Once gelatinised the starch can act to bind the polyhalite powder together. The process of gelatinisation involves the mixture being elevated to a suitable temperature, above the gelatinization temperature of the starch.

In one example of the second mixing stage, water is added to the polyhalite/starch mixture and the water is mixed together with the polyhalite and starch at a temperature below the temperature at which the starch will significantly gelatinise. Then in a second step the temperature of the mixture is raised whilst the mixture continues to be mixed, so as to cause the starch to gelatinise. To implement this, the output of the first, dry mixing stage can be passed to a first mixer where water is added to the polyhalite/starch blend and mixed into the blend, and then the output of that first mixer is passed to a second mixer in which the temperature is elevated. In a second example of the second mixing stage, water is added to the polyhalite/starch mixture under temperature conditions that are such that the starch will begin to significantly gelatinise when the water contacts the starch. Any suitable type of mixer or mixers may be used in the second mixing stage. Examples include pin mixers and twin-shaft mixers.

A range of methods may be employed to arrange that the starch is elevated to a sufficient temperature to permit gelatinisation. First, heat may be applied directly to the appropriate mixing vessel. For example, the mixing vessel may be fully or partially enclosed with a heating jacket. Or a heating element may be located within the mixing vessel. Second, the water may be heated before being applied to the polyhalite/starch mixture. In one specific example, the water may be introduced into the mixing vessel in the form of steam or vapour. For example the water as introduced may be at a temperature greater than 50° C. or 60° C. or 70° C. or 80° C. or 90° C. or 100° C. By introducing the water in the form of steam or vapour, gelling of the starch can be achieved particularly effectively, and it can be easier to achieve uniform combination of the steam or vapour with the starch than if liquid water is used. Third, the mechanical action of mixing of the polyhalite and starch can elevate the mixture's temperature, particularly if that mixing is performed with high shear. Each of these methods may be used alone or in any combination. For activation of the starch the mixture should preferably be at a temperature of at least 60° C. or 70° C.

In one preferred example, the first, dry mixing stage is performed with high shear so as to elevate the temperature of the mixture, and the output from the dry mixing stage is fed directly to a mixer for performing the second mixing stage. Water as steam or vapour is injected into the vessel of that second mixer. These measures may of themselves introduce sufficient heat that substantially all the starch in the mixture will be gelled. If necessary, the second mixer may be jacketed, and heat applied to the exterior of the mixing vessel of the second mixer whilst it mixes the polyhalite, starch and water in the second mixing stage.

The or each mixing vessel in which the second stage of mixing is performed is preferably substantially enclosed so as to resist the escape of water vapour and to retain heat in the mixture.

Once the starch is gelled, the starch and polyhalite can continue to be mixed to promote intimate binding between the gelled starch and the polyhalite powder. In a continuous mixing process in which the stock moves progressively through the mixing chamber, the length of the mixing chamber can be selected so that the material is not discharged until it has achieved a sufficient dwell time.

Once the polyhalite and gelled starch are sufficiently worked, the mixture is processed to cause it to coat previously formed pellets of urea. One way in which this can be done is to tumble the urea pellets with the mixture, for example in a horizontal or sloping rotary drum mixer which is driven to rotate about its main axis. The moisture content of the mixture and the speed of the mixer can be selected so that the urea pellets are effectively coated with the mixture. The dwell time of the pellets in the mixer can be selected so that the urea pellets are provided with the desired thickness of polyhalite coating. The axis of the mixer drum can be inclined so that material fed to the upper end of the drum will migrate to the lower end where it can be discharged. Hot air can be fed to the interior of the drum, for example to its lower end, or heat can be applied to the exterior of the drum. In this way the composite pellets can be dried so as to harden and stabilise them. The region of the drum to which the wet mixture is fed may be smooth-walled so that the pellets roll against the interior of the drum to round off. The lower region of the drum may be provided with vanes or lifters that protrude inwardly from the walls of the drum. These lift the pellets as the drum rotates and drop them into the warm air in the drum, facilitating drying. On exiting the drum the pellets have been rounded and dried to a suitable hardness for shipping. The dryer may be the same apparatus as is used to combine the polyhalite mixture and the urea pellets, or a separate device.

Other methods to coat the urea cores could be used. For example, the polyhalite mixture could be applied to a pan pelletiser together with the urea pellets, and the pan pelletiser can then be run to yield a collection of pellets of the appropriate size. Again, the moisture content of the mixture and the speed and inclination of the pelletiser should be selected to provide composite pellets of the desired size.

Once the composite pellets have been formed they may then be screened to separate out under-size and over-size pellets. The undersize pellets can be returned to the mixer where the urea pellets are combined with the polyhalite mixture.

Finally the in-size pellets can be cooled and packaged, for example in 600 kg bags or 25 kg sacks, or shipped loose for use or further processing elsewhere. The pellets can be supplied for agricultural use. Eventually they can be spread on a field or other agricultural or horticultural substrate to act as a fertiliser. The composite pellets may be used for purposes other than fertilisation.

Binders other than starch could be used.

Other additives may be included in the pellets. Such additives may one or more of the following, in any combination:
  a component having the effect of chemically and/or mechanically stabilising and/or preserving the pellets: for example to increase their shelf life, reduce their susceptibility to environmental contaminants or to reduce the likelihood of them being broken up during spreading (e.g. a pH buffer);

a component having the effect of enhancing the fertilising effect of the polyhalite and/or the urea: for example by accelerating or retarding the breakdown of the polyhalite in the field;

a component having the effect of protecting or enhancing the growth of crops by means other than fertilising: for example a herbicide, fungicide, insecticide, rodenticide, hormone, plant stimulant or mycorrhizal fungus or spore;

a seed: which may be a seed of an angiosperm and/or of a crop species (e.g. a cereal such as wheat, maize, rice, millet, barley, oats or rye);

a further fertiliser composition in addition to the polyhalite and the urea;

a pigment;

a component having the effect of altering soil pH: for example lime or sulphur.

Such a component may be added at any suitable stage in the process. For example it could be combined with the polyhalite powder prior to or during the first mixing stage as described above, or with the starch prior to the first mixing stage as described above, or with the polyhalite/binder mix between the first and second mixing stages as described above, or during the second mixing stage as described above, or it could be added to the extruder, or it could be sprayed or otherwise coated on to the pellets before or after drying.

The composite pellets are preferably substantially free from voids, for example having not more than 1%, 2% or 5% by volume of air.

The process as described above may be used for coating pellets of urea (or another nitrogen fertiliser) with a layer of a mineral other than polyhalite, and in particular for coating pellets of urea (or another nitrogen fertiliser) with pelletising feedstocks composed principally of one or more evaporite minerals, especially other chloride minerals. These may include any one or more of Anyhdrite, Carnalite, Gypsum, Halite, Kainite, Kieserite, Langbeinite and/or Sylvite. The process is especially suitable for forming coating layers from feedstocks composed principally of minerals that are substantially hygroscopic in recently powdered form and/or that have a Moh's hardness in the range from 2 to 4. Thus, the outer layer 3 of the composite pellet may be composed of more than 80% or more than 90% by mass of any one of the evaporate minerals listed above, or a combination thereof In examples given above, the internal region 1 is based on urea. The internal region 1 may be based on a nitrogen-providing composition other than urea. Examples include ammonia-based compositions and other nitrate-based compositions. Preferably the nitrogen composition of the internal region comprises greater than 20% or greater than 30% or greater than 40% nitrogen by weight.

The outer region 2 preferably comprises more than 10% by weight of two or more of potassium, calcium and magnesium. The outer region 2 preferably comprises more than 10% by weight of sulphur, and more preferably more than 15% by weight of sulphur. The sulphur is preferably present as sulphate. For manufacture of the outer region it is convenient if the outer region is an agglomerated powder of one or more minerals having the requisite composition, but the nutrient components of the outer region could be formed synthetically.

Where a property is specified above in respect of a single pellet, that criterion may be applied in the case of a bulk pelletised fertiliser as (i) the mean value over the bulk, (ii) the median value over the bulk, or (iii) by more than 50% or more than 80% of the pellets of the bulk fertiliser having the requisite property.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A fertiliser pellet comprising:
   a first region of a nitrogen-providing fertiliser composition; and
   a second region adhered to the exterior of the first region, wherein the second region substantially surrounds the first region, the second region comprising polyhalite.

2. A fertiliser pellet as claimed in claim 1, wherein the first region comprises more than 80% by weight of urea.

3. A fertiliser pellet as claimed in claim 1, wherein the first region comprises more than 30% by weight of nitrogen.

4. A fertiliser pellet as claimed in claim 1, wherein the second region comprises more than 30% by weight of alkali metal and/or alkaline earth metal nutrients.

5. A fertiliser pellet as claimed in claim 4, wherein the alkali metal and/or alkaline earth metal nutrients are or are selected from the group comprising potassium, calcium and magnesium.

6. A fertiliser pellet as claimed in claim 1, wherein the second region comprises more than 10% by weight of each of two alkali metal and/or alkaline earth metal nutrients.

7. A fertiliser pellet as claimed in claim 1, wherein the second region comprises more than 10% by weight of each of three alkali metal and/or alkaline earth metal nutrients.

8. A fertiliser pellet as claimed in claim 1, wherein the polyhalite is capable of providing (a) two or more alkali metal and/or alkaline earth metal nutrients and (b) sulphur.

9. A fertiliser pellet as claimed in claim 1, wherein the second region comprises more than 15% by weight of sulphur.

10. A fertiliser pellet as claimed in claim 1, wherein the second region comprises more than 15% by weight of sulphur in the form of sulphate.

11. A fertiliser pellet as claimed in claim 1, wherein the second region contacts the first region over substantially the whole of its interface to the first region.

12. A fertiliser pellet as claimed in claim 1, wherein the second region comprises a powder of polyhalite, and wherein the powder has a grain size in a range from about 50 μm to about 500 μm.

13. A fertiliser product comprising a plurality of pellets as claimed in claim 1.

14. A pelletised fertiliser product wherein at least 50% of the pellets are pellets as claimed in claim 1.

15. A fertiliser pellet as claimed in claim 1, wherein the first region comprises urea.

16. A fertiliser pellet as claimed in claim 1, wherein the first region comprises an ammonia-based composition or a nitrate-based composition.

17. A fertiliser pellet as claimed in claim 1, comprising a layer of binder or adhesive between the first region and the second region.

18. A fertiliser pellet as claimed in claim 1, wherein the volume of the second region is between 50% and 100%, 75% and 150%, or 100% and 200% of the volume of the first region.

19. A fertiliser pellet as claimed in claim 1, comprising a component having the effect of chemically and/or mechanically stabilising and/or preserving the pellet.

20. A fertiliser pellet as claimed in claim 1, comprising a coating over the exterior of the second region.

21. A fertiliser pellet as claimed in claim 20, wherein the coating is a sealant or a lubricant.

22. A method of forming the fertiliser pellet as claimed in claim 1, the method comprising tumbling a pellet of nitrogen-providing fertiliser composition with a mixture of polyhalite and a binder.

23. A method as claimed in claim 22, wherein the binder is starch.

24. A method as claimed in claim 22, wherein the tumbling is performed using a horizontal or sloping rotary drum mixer, or a pan pelletiser.

* * * * *